(12) United States Patent
Sibbach et al.

(10) Patent No.: US 11,725,526 B1
(45) Date of Patent: Aug. 15, 2023

(54) TURBOFAN ENGINE HAVING NACELLE WITH NON-ANNULAR INLET

(71) Applicant: General Electric Company, Schenectady, NY (US)

(72) Inventors: Arthur William Sibbach, Boxford, MA (US); Brandon Wayne Miller, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/689,010

(22) Filed: Mar. 8, 2022

(51) Int. Cl.
 *F01D 9/04* (2006.01)
 *F01D 25/24* (2006.01)

(52) U.S. Cl.
 CPC .............. *F01D 9/041* (2013.01); *F01D 25/24* (2013.01); *F05D 2240/12* (2013.01); *F05D 2240/14* (2013.01); *F05D 2250/51* (2013.01); *F05D 2260/14* (2013.01)

(58) Field of Classification Search
 CPC ...... F01D 9/041; F01D 25/24; F05D 2240/12; F05D 2240/14; F05D 2250/51; F05D 2260/14
 See application file for complete search history.

(56) References Cited

U.S. PATENT DOCUMENTS

| | | | |
|---|---|---|---|
| 3,540,682 | A | 11/1970 | Dibble et al. |
| 3,618,876 | A | 11/1971 | Skidmore |
| 3,664,612 | A | 5/1972 | Skidmore et al. |
| 4,254,619 | A | 3/1981 | Griffin, III et al. |
| 5,010,729 | A | 4/1991 | Adamson et al. |
| 5,458,457 | A | 10/1995 | Goto et al. |
| 6,409,469 | B1 | 6/2002 | Tse |
| 6,431,820 | B1 | 8/2002 | Beacock et al. |
| 6,457,938 | B1 | 10/2002 | Liu et al. |
| 6,508,630 | B2 | 1/2003 | Liu et al. |
| 6,540,477 | B2 | 4/2003 | Glynn et al. |
| 6,546,734 | B2 | 4/2003 | Antoine et al. |
| 6,585,482 | B1 | 7/2003 | Liotta et al. |
| 6,834,505 | B2 | 12/2004 | Al-Roub et al. |
| 7,025,565 | B2 | 4/2006 | Urso et al. |
| 7,055,304 | B2 | 6/2006 | Courtot et al. |
| 7,210,900 | B2 | 5/2007 | Urso et al. |

(Continued)

FOREIGN PATENT DOCUMENTS

| CN | 101922312 | 12/2010 |
|---|---|---|
| GB | 2403778 A | 1/2005 |

OTHER PUBLICATIONS

Willis, Quiet Clean Short-haul Experimental Engine (QCSEE) Final Report, NASA-CR-159473, Aug. 1979, 312 Pages.

*Primary Examiner* — Igor Kershteyn
(74) *Attorney, Agent, or Firm* — Dority & Manning, P.A.

(57) ABSTRACT

A turbofan engine includes a fan having a plurality of fan blades, a turbomachine operably coupled to the fan for driving the fan, the turbomachine including a compressor section, a combustion section, and a turbine section in serial flow order and together defining a core air flowpath, a nacelle surrounding and at least partially enclosing the fan, the nacelle including an inlet at a leading edge of the nacelle, the inlet defining an interior inlet surface that is non-annular, and an inlet pre-swirl feature located upstream of the plurality of fan blades, the inlet pre-swirl feature attached to or integrated into the nacelle.

20 Claims, 11 Drawing Sheets

(56) References Cited

U.S. PATENT DOCUMENTS

| | | | |
|---|---|---|---|
| 7,246,773 B2 | 7/2007 | Stoner et al. | |
| 7,313,963 B2 | 1/2008 | Kuznar | |
| 7,374,403 B2 | 5/2008 | Decker et al. | |
| 7,374,404 B2 | 5/2008 | Schilling | |
| 7,407,364 B2 | 8/2008 | Arnold et al. | |
| 7,413,401 B2 | 8/2008 | Szucs et al. | |
| 7,789,620 B2 | 9/2010 | Vontell, Sr. et al. | |
| 7,854,778 B2 | 12/2010 | Groom et al. | |
| 7,871,244 B2 | 1/2011 | Marini et al. | |
| 7,874,137 B2 | 1/2011 | Chaney et al. | |
| 7,882,694 B2 | 2/2011 | Suciu et al. | |
| 7,955,046 B2 | 6/2011 | McCune et al. | |
| 8,021,104 B2 | 9/2011 | Gu et al. | |
| 8,226,360 B2 | 7/2012 | Scoggins et al. | |
| 8,328,518 B2 | 12/2012 | Liang et al. | |
| 8,529,188 B2 | 9/2013 | Winter | |
| 8,689,538 B2 | 4/2014 | Sankrithi et al. | |
| 8,690,519 B2 | 4/2014 | Aalburg et al. | |
| 8,757,959 B2 | 6/2014 | Suciu et al. | |
| 8,806,871 B2 | 8/2014 | McMasters et al. | |
| 8,943,796 B2 | 2/2015 | McCaffrey | |
| 9,003,808 B2 | 4/2015 | Kupratis | |
| 9,039,364 B2 | 5/2015 | Alvanos et al. | |
| 9,045,991 B2 | 6/2015 | Read et al. | |
| 9,068,470 B2 | 6/2015 | Mills et al. | |
| 9,074,483 B2 | 7/2015 | Breeze-Stringfellow et al. | |
| 9,140,212 B2 | 9/2015 | Moon et al. | |
| 9,206,697 B2 | 12/2015 | Tibbott et al. | |
| 9,206,740 B2 | 12/2015 | Wong et al. | |
| 9,228,497 B2 | 1/2016 | Ottow et al. | |
| 9,506,361 B2 | 11/2016 | Fielding et al. | |
| 9,523,284 B2 | 12/2016 | Miller et al. | |
| 9,540,094 B2 | 1/2017 | Negulescu et al. | |
| 9,695,751 B2 | 7/2017 | Kupratis et al. | |
| 9,784,134 B2 | 10/2017 | Eleftheriou | |
| 9,797,261 B2 | 10/2017 | Tibbott et al. | |
| 9,835,092 B2 | 12/2017 | Sawyers-Abbott et al. | |
| 9,840,930 B2 | 12/2017 | Lee et al. | |
| 9,863,256 B2 | 1/2018 | Lee et al. | |
| 9,874,102 B2 | 1/2018 | Azad et al. | |
| 9,874,109 B2 | 1/2018 | Hatcher, Jr. et al. | |
| 9,945,247 B2 | 4/2018 | Appukuttan et al. | |
| 9,957,918 B2 | 5/2018 | Suciu et al. | |
| 10,018,167 B2 | 7/2018 | Tentorio | |
| 10,060,270 B2 | 8/2018 | Lee et al. | |
| 10,060,351 B2 | 8/2018 | Oggero | |
| 10,066,508 B2 | 9/2018 | Geiger | |
| 10,113,444 B2 | 10/2018 | Huang et al. | |
| 10,131,443 B2 | 11/2018 | Namgoong | |
| 10,145,301 B2 | 12/2018 | Abrari et al. | |
| 10,184,340 B2 | 1/2019 | Baltas et al. | |
| 10,196,895 B2 | 2/2019 | Weinert et al. | |
| 10,196,901 B2 | 2/2019 | Wong et al. | |
| 10,215,192 B2 | 2/2019 | Griffin | |
| 10,240,526 B2 | 3/2019 | Suciu et al. | |
| 10,252,790 B2 | 4/2019 | Ramakrishnan | |
| 10,260,527 B2 | 4/2019 | Steen | |
| 10,273,880 B2 | 4/2019 | Kolvick et al. | |
| 10,288,010 B2 | 5/2019 | Houston et al. | |
| 10,288,083 B2 | 5/2019 | Miller et al. | |
| 10,344,711 B2 | 7/2019 | Hsu | |
| 10,371,054 B2 | 8/2019 | Sasse et al. | |
| 10,378,554 B2 | 8/2019 | Yu et al. | |
| 10,385,871 B2 | 8/2019 | Lurie et al. | |
| 10,393,132 B2 | 8/2019 | Lee et al. | |
| 10,399,664 B2 | 9/2019 | Bowden et al. | |
| 10,415,409 B2 | 9/2019 | Oyarbide | |
| 10,436,046 B2 | 10/2019 | Fentem et al. | |
| 10,480,328 B2 | 11/2019 | Weaver et al. | |
| 10,480,413 B2 | 11/2019 | Snyder | |
| 10,502,232 B2 | 12/2019 | Mohtar et al. | |
| 10,519,859 B2 | 12/2019 | Marchaj et al. | |
| 10,557,415 B2 | 2/2020 | Boudebiza et al. | |
| 10,563,513 B2 | 2/2020 | Kalitzin et al. | |
| 10,634,059 B2 | 4/2020 | Rami et al. | |
| 10,641,178 B2 | 5/2020 | Corrandini et al. | |
| 10,690,146 B2 | 6/2020 | Urac et al. | |
| 10,695,704 B2 | 6/2020 | Mook et al. | |
| 10,711,797 B2 * | 7/2020 | Kroger | F04D 29/684 |
| 10,724,395 B2 | 7/2020 | Kupratis et al. | |
| 10,724,435 B2 | 7/2020 | Kroger et al. | |
| 10,738,694 B1 | 8/2020 | Kupratis et al. | |
| 10,787,909 B2 | 9/2020 | Hiemaux | |
| 10,794,224 B2 | 10/2020 | Schiessl | |
| 10,794,292 B2 | 10/2020 | Kupratis et al. | |
| 10,794,395 B2 | 10/2020 | Tamada | |
| 10,794,396 B2 | 10/2020 | Kroger et al. | |
| 10,801,442 B2 | 10/2020 | Clements et al. | |
| 10,815,886 B2 | 10/2020 | Kroger et al. | |
| 10,816,208 B2 | 10/2020 | DiCintio et al. | |
| 10,822,999 B2 | 11/2020 | Morris et al. | |
| 10,823,114 B2 | 11/2020 | Clements et al. | |
| 10,830,135 B2 | 11/2020 | Slawinska et al. | |
| 10,837,361 B2 | 11/2020 | Abrari et al. | |
| 10,883,515 B2 | 1/2021 | Lurie et al. | |
| 10,961,864 B2 | 3/2021 | Miranda et al. | |
| 11,480,063 B1 * | 10/2022 | Miller | F01D 5/145 |
| 2001/0023582 A1 | 9/2001 | Nagel | |
| 2008/0041064 A1 | 2/2008 | Moore et al. | |
| 2008/0155959 A1 | 7/2008 | Rasheed et al. | |
| 2008/0232963 A1 | 9/2008 | Durocher et al. | |
| 2009/0155053 A1 | 6/2009 | Speak | |
| 2009/0255116 A1 | 10/2009 | McMasters et al. | |
| 2009/0277181 A1 | 11/2009 | Druon et al. | |
| 2011/0044796 A1 | 2/2011 | Hussain et al. | |
| 2012/0240594 A1 | 9/2012 | Shamara | |
| 2013/0192263 A1 | 8/2013 | Suciu et al. | |
| 2013/0323011 A1 | 12/2013 | Chopra et al. | |
| 2014/0208755 A1 | 7/2014 | Ekanayake et al. | |
| 2014/0208768 A1 | 7/2014 | Bacic | |
| 2014/0318137 A1 | 10/2014 | McMasters et al. | |
| 2015/0198050 A1 | 7/2015 | Lee et al. | |
| 2015/0198163 A1 | 7/2015 | Lei et al. | |
| 2016/0003046 A1 | 1/2016 | Smith et al. | |
| 2016/0017751 A1 | 1/2016 | Caruel | |
| 2016/0047307 A1 | 2/2016 | Williamson et al. | |
| 2016/0047308 A1 | 2/2016 | Williamson et al. | |
| 2016/0047309 A1 | 2/2016 | Davidson et al. | |
| 2016/0047335 A1 | 2/2016 | Davidson et al. | |
| 2016/0084265 A1 * | 3/2016 | Yu | F02C 7/045 415/177 |
| 2016/0195010 A1 | 7/2016 | Roberge | |
| 2017/0030213 A1 | 2/2017 | Vlasic et al. | |
| 2017/0138202 A1 | 5/2017 | Wadia et al. | |
| 2017/0146026 A1 | 5/2017 | Griffin | |
| 2017/0191372 A1 | 7/2017 | Tralshawala et al. | |
| 2017/0292532 A1 | 10/2017 | Wall | |
| 2017/0298751 A1 | 10/2017 | Messmann et al. | |
| 2017/0314509 A1 | 11/2017 | Laricchiuta et al. | |
| 2018/0010617 A1 | 1/2018 | Casavant et al. | |
| 2018/0045059 A1 | 2/2018 | Lee et al. | |
| 2018/0112546 A1 | 4/2018 | Griffin | |
| 2018/0135432 A1 | 5/2018 | Martin, Jr. et al. | |
| 2018/0216527 A1 | 8/2018 | D'Angelo et al. | |
| 2018/0223733 A1 | 8/2018 | Zhang et al. | |
| 2018/0230944 A1 | 8/2018 | Suciu et al. | |
| 2018/0283183 A1 | 10/2018 | Gallier et al. | |
| 2018/0334916 A1 | 11/2018 | Lurie et al. | |
| 2018/0363554 A1 * | 12/2018 | Kroger | F02C 3/04 |
| 2018/0363676 A1 * | 12/2018 | Kroger | F04D 29/542 |
| 2018/0363677 A1 * | 12/2018 | Kroger | F04D 29/681 |
| 2018/0363678 A1 * | 12/2018 | Kroger | F02C 7/04 |
| 2019/0010868 A1 | 1/2019 | Davidson et al. | |
| 2019/0048798 A1 | 2/2019 | Slawinska et al. | |
| 2019/0063243 A1 | 2/2019 | Lemaire | |
| 2019/0107119 A1 | 4/2019 | Yu et al. | |
| 2019/0226402 A1 | 7/2019 | Kray et al. | |
| 2019/0284693 A1 | 9/2019 | Task | |
| 2019/0284940 A1 | 9/2019 | Task et al. | |
| 2019/0338707 A1 | 11/2019 | Beecroft et al. | |
| 2019/0368421 A1 | 12/2019 | Sweidan | |
| 2020/0025110 A1 | 1/2020 | Silkowski | |
| 2020/0049077 A1 | 2/2020 | Schwarz et al. | |
| 2020/0080432 A1 | 3/2020 | Filipenco | |

(56) References Cited

U.S. PATENT DOCUMENTS

| | | |
|---|---|---|
| 2020/0123918 A1 | 4/2020 | Duong et al. |
| 2020/0141277 A1 | 5/2020 | Cooper et al. |
| 2020/0149421 A1 | 5/2020 | Lad |
| 2020/0276641 A1 | 9/2020 | Benard et al. |
| 2020/0284261 A1 | 9/2020 | Merchant et al. |
| 2020/0300174 A1 | 9/2020 | Williamson et al. |
| 2020/0316508 A1 | 10/2020 | Mook et al. |
| 2020/0347737 A1 | 11/2020 | Bordoni |
| 2021/0078715 A1 | 3/2021 | Bevirt et al. |
| 2021/0087948 A1 | 3/2021 | Suciu |
| 2021/0108597 A1 | 4/2021 | Ostdiek et al. |
| 2023/0028503 A1* | 1/2023 | Sibbach .................... F02K 3/06 |
| 2023/0053554 A1* | 2/2023 | Sibbach .................. F01D 9/041 |
| 2023/0060010 A1* | 2/2023 | Sibbach .................... F02C 7/05 |

* cited by examiner

US 11,725,526 B1

TURBOFAN ENGINE HAVING NACELLE WITH NON-ANNULAR INLET

TECHNICAL FIELD

The present subject matter relates generally to a gas turbine engine, or more particularly to a gas turbine engine configured to guide an airflow at an inlet of a nacelle.

BACKGROUND

A turbofan engine generally includes a fan having a plurality of fan blades and a turbomachine arranged in flow communication with one another. Additionally, the turbomachine of the turbofan engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

The turbomachine may be configured to drive the fan. However, efficiency losses in an upper span of the fan blades may result in a less efficient turbofan engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Figure 1:
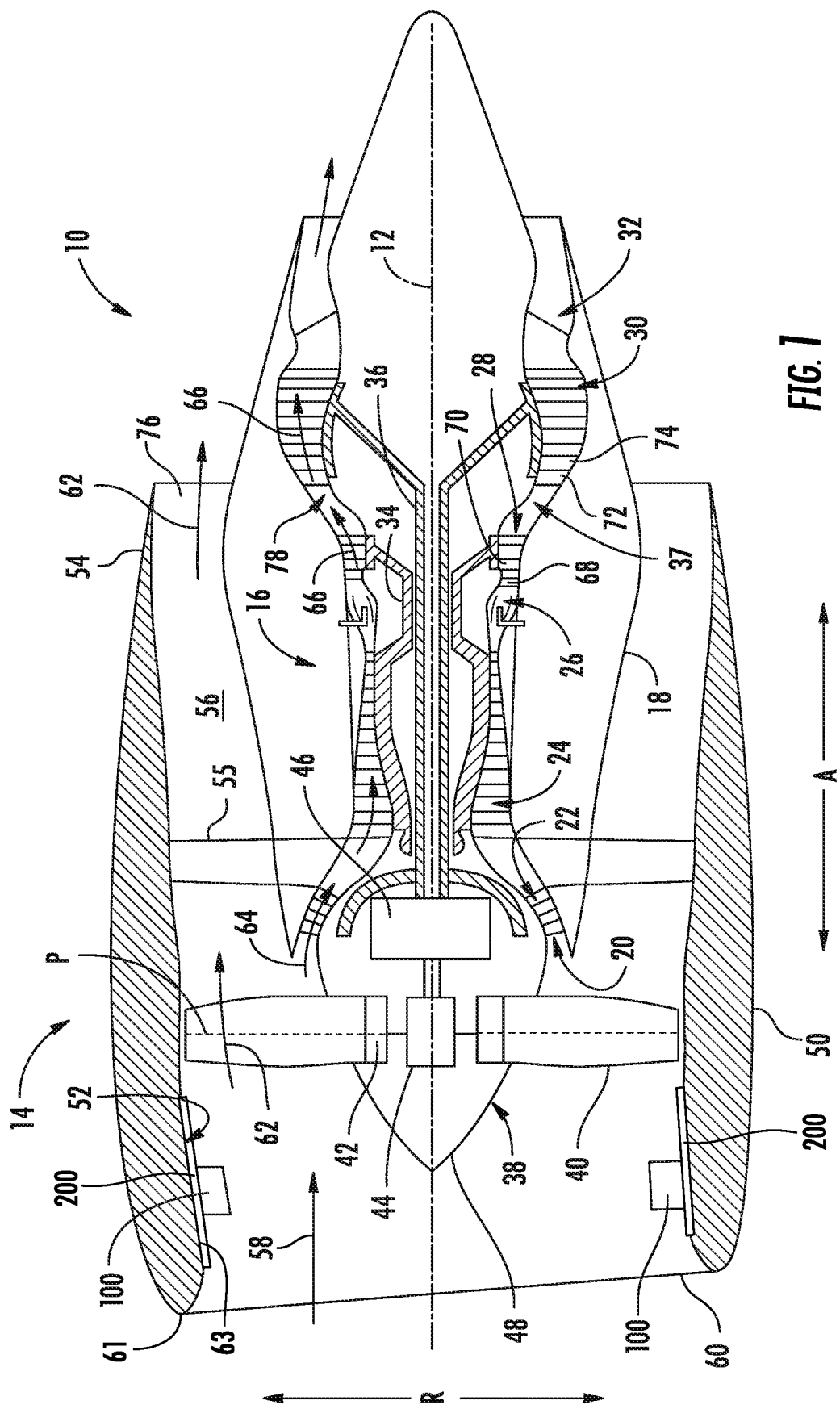
FIG. 1 is a schematic cross-sectional view of an exemplary gas turbine engine according to an exemplary embodiment of the present subject matter.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The following description is provided to enable those skilled in the art to make and to use the described embodiments contemplated for carrying out the disclosure. Various modifications, equivalents, variations, and alternatives, however, will remain readily apparent to those skilled in the art. Any and all such modifications, variations, equivalents, and alternatives are intended to fall within the scope of the present disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

For purposes of the description hereinafter, the terms "upper", "lower", "right", "left", "vertical", "horizontal", "top", "bottom", "lateral", "longitudinal", and derivatives thereof shall relate to the disclosure as it is oriented in the drawing figures. However, it is to be understood that the disclosure may assume various alternative variations, except where expressly specified to the contrary. The specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine, with forward referring to a position closer to an engine inlet and aft referring to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Additionally, the terms "low," "high," or their respective comparative degrees (e.g., lower, higher, where applicable) each refers to relative speeds or pressures within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section. An engine of the present disclosure may also include an intermediate pressure turbine, e.g., an engine having three spools.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "fan pressure ratio" refers to a ratio of an air pressure immediately downstream of the fan blades of a fan during operation of the fan to an air pressure immediately upstream of the fan blades of the fan during operation of the fan.

As used herein, the term "rated speed" with reference to a turbofan engine refers to a maximum rotational speed that the turbofan engine may achieve while operating properly. For example, the turbofan engine may be operating at the rated speed during maximum load operations, such as during takeoff operations.

Also as used herein, the term "fan tip speed" as defined by the plurality of fan blades of the fan refers to a linear speed of an outer tip of a fan blade along a radial direction during operation of the fan.

The present disclosure is generally related to an outer nacelle of a turbofan engine that includes an inlet at a leading edge of the outer nacelle. The inlet defines an interior inlet surface that is non-annular and the outer nacelle further includes one or more inlet pre-swirl features. As used herein, the term "non-annular" with reference to the interior inlet surface refers to a shape of the interior inlet surface deviating from an absolute annular shape more than would necessarily be present due to limitations in manufacturing capabilities and normal wear of an outer nacelle of a turbofan engine. Further, the term "non-annular" with reference to the interior inlet surface refers to the interior inlet surface itself, and not any additional features, such as inlet pre-swirl feature(s), and associated mounting or coupling structures (such as a beveled edge between an inlet pre-swirl feature and the interior inlet surface).

In this manner, the non-annular interior inlet surface of the inlet guides a volume of air that enters the turbofan engine through the inlet of the outer nacelle. Furthermore, the non-annular interior inlet surface of the inlet also begins a pre-swirling flow forward of the fan blades of a fan. Furthermore, the non-annular interior inlet surface of the inlet helps to guide the boundary layer air along the inside surface of the engine nacelle inlet. Because the boundary layer air tends to be turbulent, the non-annular interior inlet surface of the inlet helps to minimize separation of the air from the surface of the nacelle.

In this manner, pre-swirling the airflow provided through the inlet of the nacelle prior to such airflow reaching the plurality of fan blades of the fan may reduce separation losses and/or shock losses, allowing the fan to operate with the relatively high fan tip speeds described herein with less losses in efficiency.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is an aeronautical, turbofan jet engine 10, referred to herein as "turbofan engine 10", configured to be mounted to an aircraft, such as in an under-wing configuration or tail-mounted configuration. As shown in FIG. 1, the turbofan engine 10 defines an axial direction A (extending parallel to a longitudinal centerline 12 provided for reference), a radial direction R, and a circumferential direction (i.e., a direction extending about the axial direction A; not depicted). In general, the turbofan 10 includes a fan section 14 and a turbomachine 16 disposed downstream from the fan section 14 (the turbomachine 16 is sometimes also, or alternatively, referred to as a "core turbine engine").

The exemplary turbomachine 16 depicted generally includes a substantially tubular outer casing 18 that defines an annular inlet 20. The outer casing 18 encases, in serial flow relationship, a compressor section including a first, booster or low pressure (LP) compressor 22 and a second, high pressure (HP) compressor 24; a combustion section 26; a turbine section including a first, high pressure (HP) turbine 28 and a second, low pressure (LP) turbine 30; and a jet exhaust nozzle section 32. A high pressure (HP) shaft 34 drivingly connects the HP turbine 28 to the HP compressor 24. A low pressure (LP) shaft 36 drivingly connects the LP turbine 30 to the LP compressor 22. The compressor section, combustion section 26, turbine section, and jet exhaust nozzle section 32 are arranged in serial flow order and together define a core air flowpath 37 through the turbomachine 16. It is also contemplated that the present disclosure is compatible with an engine having an intermediate pressure turbine, e.g., an engine having three spools.

Referring still the embodiment of FIG. 1, the fan section 14 includes a variable pitch, single stage fan 38, the turbomachine 16 operably coupled to the fan 38 for driving the fan 38. The fan 38 includes a plurality of rotatable fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40, e.g., in unison. The fan blades 40, disk 42, and actuation member 44 are together rotatable about the longitudinal centerline 12 by LP shaft 36 across a power gear box 46. The power gear box 46 includes a plurality of gears for stepping down the rotational speed of the LP shaft 36 to a more efficient rotational fan speed. Accordingly, for the embodiment depicted, the turbomachine 16 is operably coupled to the fan 38 through the power gear box 46.

In exemplary embodiments, the fan section 14 includes twenty-two (22) or fewer fan blades 40. In certain exemplary embodiments, the fan section 14 includes twenty (20) or fewer fan blades 40. In certain exemplary embodiments, the fan section 14 includes eighteen (18) or fewer fan blades 40. In certain exemplary embodiments, the fan section 14 includes sixteen (16) or fewer fan blades 40. In certain exemplary embodiments, it is contemplated that the fan section 14 includes other number of fan blades 40 for a particular application.

During operation of the turbofan engine 10, the fan 38 defines a fan pressure ratio and the plurality of fan blades 40 each defines a fan tip speed. The exemplary turbofan engine 10 depicted defines a relatively high fan tip speed and a relatively low fan pressure ratio during operation of the turbofan engine at a rated speed. As used herein, the term "fan pressure ratio" refers to a ratio of an air pressure immediately downstream of the fan blades 40 during operation of the fan 38 to an air pressure immediately upstream of the fan blades 40 during operation of the fan 38. For the embodiment depicted in FIG. 1, the fan 38 of the turbofan engine 10 defines a relatively low fan pressure ratio. For example, the turbofan engine 10 depicted defines a fan pressure ratio less than or equal to about 1.5. For example, in certain exemplary embodiments, the turbofan engine 10 may define a fan pressure ratio less than or equal to about 1.4. In certain exemplary embodiments, it is contemplated that the turbofan engine 10 may define other fan pressure ratios for a particular application. The fan pressure ratio may be the fan pressure ratio of the fan 38 during operation of the turbofan engine 10, such as during operation of the turbofan engine 10 at a rated speed.

As used herein, the term "rated speed" with reference to the turbofan engine 10 refers to a maximum rotational speed that the turbofan engine 10 may achieve while operating properly. For example, the turbofan engine 10 may be operating at the rated speed during maximum load operations, such as during takeoff operations.

Also, as used herein, the term "fan tip speed" defined by the plurality of fan blades 40 refers to a linear speed of an outer tip of a fan blade 40 along the radial direction R during operation of the fan 38. In exemplary embodiments, the turbofan engine 10 of the present disclosure causes the fan blades 40 of the fan 38 to rotate at a relatively high rotational speed. For example, during operation of the turbofan engine 10 at the rated speed, the fan tip speed of each of the plurality of fan blades 40 is greater than or equal to 1000 feet per second and less than or equal to 2250 feet per second. In certain exemplary embodiments, during operation of the turbofan engine 10 at the rated speed, the fan tip speed of each of the fan blades 40 may be greater than or equal to 1,250 feet per second and less than or equal to 2250 feet per second. In certain exemplary embodiments, during operation of the turbofan engine 10 at the rated speed, the fan tip speed of each of the fan blades 40 may be greater than or equal to about 1,350 feet per second, such as greater than about 1,450 feet per second, such as greater than about 1,550 feet per second, and less than or equal to 2250 feet per second.

Referring still to the exemplary embodiment of FIG. 1, the disk 42 is covered by rotatable front nacelle or hub 48 aerodynamically contoured to promote an airflow through the plurality of fan blades 40. Additionally, the exemplary fan section 14 includes an annular fan casing or outer nacelle 50 that at least partially, and for the embodiment depicted, circumferentially, surrounds the fan 38 and at least a portion of the turbomachine 16.

More specifically, the outer nacelle 50 includes an inner wall 52 and a downstream section 54 of the inner wall 52 of the outer nacelle 50 extends over an outer portion of the turbomachine 16 so as to define a bypass airflow passage 56 therebetween. Additionally, for the embodiment depicted, the outer nacelle 50 is supported relative to the turbomachine 16 by a plurality of circumferentially spaced outlet guide vanes 55. The outer nacelle 50 includes an inlet 60 at a leading edge 61 of the outer nacelle 50. The inlet 60 defines an interior inlet surface 63 that is non-annular as described in more detail herein.

During operation of the turbofan engine 10, a volume of air 58 enters the turbofan engine 10 through the inlet 60 of the outer nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37. The ratio between an amount of airflow through the bypass airflow passage 56 (i.e., the first portion of air indicated by arrows 62) to an amount of airflow through the core air flowpath 37 (i.e., the second portion of air indicated by arrows 64) is known as a bypass ratio.

In exemplary embodiments, the bypass ratio during operation of the turbofan engine 10 (e.g., at a rated speed) is less than or equal to about eleven (11). For example, the bypass ratio during operation of the turbofan engine 10 (e.g., at a rated speed) may be less than or equal to about ten (10), such as less than or equal to about nine (9). Additionally, the bypass ratio may be at least about two (2).

In other exemplary embodiments, the bypass ratio may generally be between about 7:1 and about 20:1, such as between about 10:1 and about 18:1. The pressure of the second portion of air indicated by arrows 64 is then increased as it is routed through the high pressure (HP) compressor 24 and into the combustion section 26, where it is mixed with fuel and burned to provide combustion gases 66.

In exemplary embodiments, a gear ratio of the power gear box 46 is greater than or equal to 1.2 and less than or equal to 3.0. In some exemplary embodiments, the gear ratio of the power gear box 46 is greater than or equal to 1.2 and less than or equal to 2.6. In other exemplary embodiments, the gear ratio of the power gear box 46 is greater than or equal to 1.2 and less than or equal to 2.0.

Referring still to FIG. 1, the compressed second portion of air indicated by arrows 64 from the compressor section mixes with fuel and is burned within the combustion section to provide combustion gases 66. The combustion gases 66 are routed from the combustion section 26, through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft 34, thus causing the HP shaft 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air indicated by arrows 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the turbomachine 16.

Referring still to FIG. 1, the turbofan engine 10 of the present disclosure also provides pre-swirling flow forward of a tip of the fan blade 40 as described herein. For example, the turbofan engine 10 additionally includes an inlet pre-swirl feature, e.g., configured as a plurality of part span inlet guide vanes 100, as described in greater detail herein.

In some exemplary embodiments, the exemplary turbofan engine 10 of the present disclosure may be a relatively large power class turbofan engine 10. Accordingly, when operated at the rated speed, the turbofan engine 10 may be configured to generate a relatively large amount of thrust. More specifically, when operated at the rated speed, the turbofan engine 10 may be configured to generate at least about 20,000 pounds of thrust, such as at least about 25,000 pounds of thrust, such as at least about 30,000 pounds of thrust, and up to, e.g., about 150,000 pounds of thrust. Accordingly, the turbofan engine 10 may be referred to as a relatively large power class gas turbine engine.

Moreover, it should be appreciated that the exemplary turbofan engine 10 depicted in FIG. 1 is by way of example only, and that in other exemplary embodiments, the turbofan engine 10 may have any other suitable configuration. For example, in certain exemplary embodiments, the fan may not be a variable pitch fan, the engine may not include a reduction gearbox (e.g., power gearbox 46) driving the fan, may include any other suitable number or arrangement of shafts, spools, compressors, turbines, etc.

Figure 2:
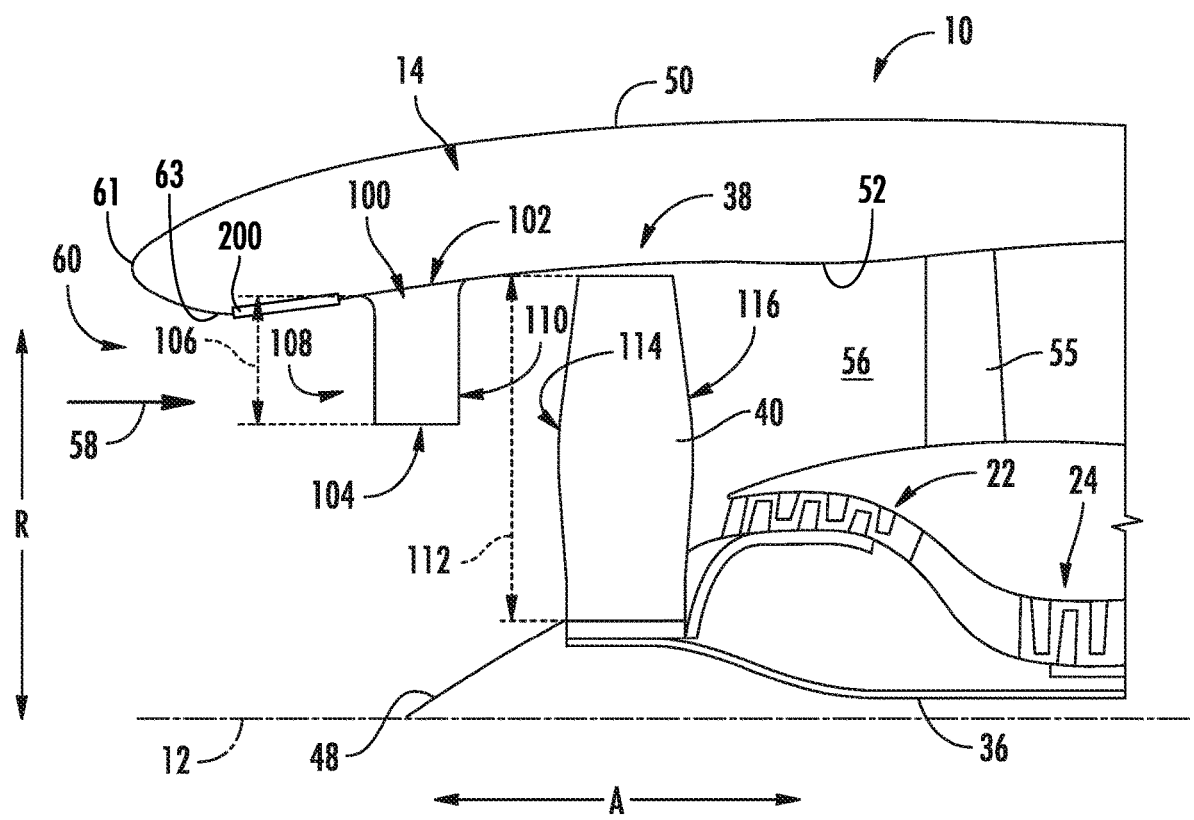
FIG. 2 is a close-up, schematic view of a forward end of the exemplary gas turbine engine of FIG. 1 according to an exemplary embodiment of the present subject matter.

As discussed above, the turbofan engine 10 of the present disclosure also provides pre-swirling flow forward a tip of the fan blade 40. Referring now also to FIG. 2, a close-up, schematic view of the fan section 14 and forward end of the turbomachine 16 of the exemplary turbofan engine 10 of FIG. 1 is provided. In exemplary embodiments, the turbofan engine 10 includes an inlet pre-swirl feature located upstream of the plurality of fan blades 40 of the fan 38 and attached to or integrated into the outer nacelle 50. More specifically, for the embodiment of FIGS. 1 and 2, the inlet pre-swirl feature is configured as a plurality of part span inlet guide vanes 100. The plurality of part span inlet guide vanes 100 are each cantilevered from the outer nacelle 50 (such as from the inner wall 52 of the outer nacelle 50) at a location forward of the plurality of fan blades 40 of the fan 38 along the axial direction A and aft of the inlet 60 of the outer nacelle 50. More specifically, each of the plurality of part span inlet guide vanes 100 defines an outer end 102 along the radial direction R, and are attached to/connected to the outer nacelle 50 at the radially outer end 102 through a suitable connection means (not shown). For example, each of the plurality of part span inlet guide vanes 100 may be bolted to the inner wall 52 of the outer nacelle 50 at the outer end 102, welded to the inner wall 52 of the outer nacelle 50 at the outer end 102, or attached to the outer nacelle 50 in any other suitable manner at the outer end 102.

Further, for the embodiment depicted, the plurality of part span inlet guide vanes 100 extend generally along the radial direction R from the outer end 102 to an inner end 104 (i.e., an inner end 104 along the radial direction R). Moreover, as will be appreciated, for the embodiment depicted, each of the plurality of part span inlet guide vanes 100 are unconnected with an adjacent part span inlet guide vane 100 at the respective inner ends 104 (i.e., adjacent part span inlet guide vanes 100 do not contact one another at the radially inner ends 104, and do not include any intermediate connection members at the radially inner ends 104, such as a connection ring, strut, etc.). More specifically, for the embodiment depicted, each part span inlet guide vane 100 is completely supported by a connection to the outer nacelle 50 at the respective outer end 102 (and not through any structure extending, e.g., between adjacent part span inlet guide vanes 100 at a location inward of the outer end 102 along the radial direction R). As will be discussed below, such may reduce an amount of turbulence generated by the part span inlet guide vanes 100.

Moreover, is depicted, each of the plurality of part span inlet guide vanes 100 does not extend completely between the outer nacelle 50 and, e.g., the hub 48 of the turbofan engine 10. More specifically, for the embodiment depicted, each of the plurality of inlet guide vane defines an inlet guide vane ("IGV") span 106 along the radial direction R, and further each of the plurality of part span inlet guide vanes 100 also defines a leading edge 108 and a trailing edge 110. The IGV span 106 refers to a measure along the radial direction R between the outer end 102 and the inner end 104 of the part span inlet guide vane 100 at the leading edge 108 of the part span inlet guide vane 100. Similarly, the plurality of fan blades 40 of the fan 38 define a fan blade span 112 along the radial direction R. More specifically, each of the plurality of fan blades 40 of the fan 38 also defines a leading edge 114 and a trailing edge 116, and the fan blade span 112 refers to a measure along the radial direction R between a radially outer tip and a base of the fan blade 40 at the leading edge 114 of the respective fan blade 40.

For the embodiment depicted, the IGV span 106 is at least about five percent of the fan blade span 112 and up to about fifty-five percent of the fan blade span 112. For example, in certain exemplary embodiments, the IGV span 106 may be between about fifteen percent of the fan blade span 112 and about forty-five percent of the fan blade span 112, such as between about thirty percent of the fan blade span 112 and about forty percent of the fan blade span 112.

Figure 4:
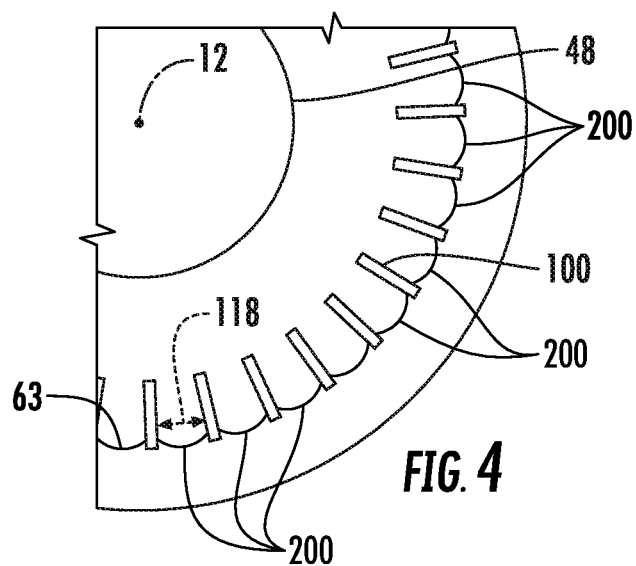
FIG. 4 is a partial schematic view of an inlet to the exemplary gas turbine engine of FIG. 1, along an axial direction of the gas turbine engine of FIG. 1 according to an exemplary embodiment of the present subject matter.

Reference will now also be made to FIG. 4, providing a partial axial view of the inlet 60 to the turbofan engine 10 of FIGS. 1 and 2. As will be appreciated, for the embodiment depicted, the plurality of part span inlet guide vanes 100 of the turbofan engine 10 includes a relatively large number of part span inlet guide vanes 100. More specifically, for the embodiment depicted, the plurality of part span inlet guide vanes 100 includes between about ten part span inlet guide vanes 100 and about fifty part span inlet guide vanes 100. More specifically, for the embodiment depicted, the plurality of part span inlet guide vanes 100 includes between about twenty part span inlet guide vanes 100 and about forty-five part span inlet guide vanes 100, and more specifically, still, the embodiment depicted includes thirty-two part span inlet guide vanes 100. Additionally, for the embodiment depicted, each of the plurality of part span inlet guide vanes 100 are spaced substantially evenly along the circumferential direction C. More specifically, each of the plurality of part span inlet guide vanes 100 defines a circumferential spacing 118 with an adjacent part span inlet guide vane 100, with the circumferential spacing 118 being substantially equal between each adjacent part span inlet guide vane 100.

Although not depicted, in certain exemplary embodiments, the number of part span inlet guide vanes 100 may be substantially equal to the number of fan blades 40 of the fan 38 of the turbofan engine 10. In other embodiments, however, the number of part span inlet guide vanes 100 may be greater than the number of fan blades 40 of the fan 38 of the turbofan engine 10, or alternatively, may be less than the number of fan blades 40 of the fan 38 of the turbofan engine 10. In other exemplary embodiments, the number of part span inlet guide vanes 100 may be significantly greater than the number of fan blades 40 of the fan 38 of the turbofan engine 10. For example, it is contemplated that the ratio of the number of part span inlet guide vanes 100 to the number of fan blades 40 of the fan 38 may be at least 10:1. In other embodiments, it is contemplated that the ratio of the number of part span inlet guide vanes 100 to the number of fan blades 40 of the fan 38 may be at least 15:1. In other embodiments, it is contemplated that the ratio of the number of part span inlet guide vanes 100 to the number of fan blades 40 of the fan 38 may be at least 5:1.

For example, the turbofan engine 10 depicted defines a fan pressure ratio less than or equal to about 1.5. For example, in certain exemplary embodiments, the turbofan engine 10 may define a fan pressure ratio less than or equal to about 1.4. In certain exemplary embodiments, it is contemplated that the turbofan engine 10 may define other fan pressure ratios for a particular application. The fan pressure ratio may be the fan pressure ratio of the fan 38 during operation of the turbofan engine 10, such as during operation of the turbofan engine 10 at a rated speed.

Figure 8:
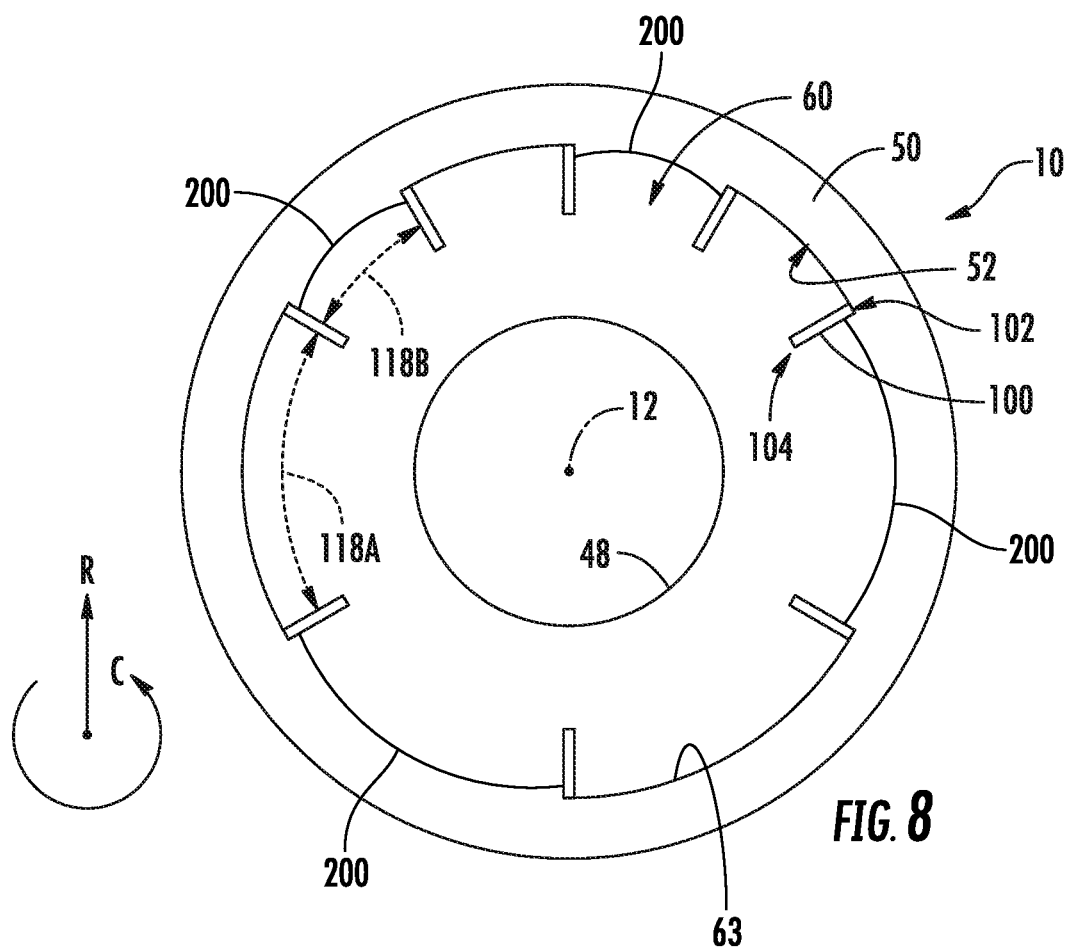
FIG. 8 is a schematic view of an inlet to a gas turbine engine in accordance with another exemplary embodiment of the present disclosure.

Further, it should be appreciated, that in other exemplary embodiments, the turbofan engine 10 may include any other suitable number of part span inlet guide vanes 100 and/or circumferential spacing 118 of the part span inlet guide vanes 100. For example, referring now briefly to FIG. 8, an axial view of an inlet 60 to a turbofan engine 10 in accordance with another exemplary embodiment of the present disclosure is provided. For the embodiment of FIG. 8, the turbofan engine 10 includes fewer than twenty part span inlet guide vanes 100. More specifically, for the embodiment of FIG. 8, the turbofan engine 10 includes at least eight part span inlet guide vanes 100, or more specifically includes exactly eight part span inlet guide vanes 100. Additionally, for the embodiment of FIG. 8, the plurality of part span inlet guide vanes 100 are not substantially evenly spaced along the circumferential direction C. For example, at least certain of the plurality of part span inlet guide vanes 100 define a first circumferential spacing 118A, while other of the plurality of part span inlet guide vanes 100 define a second circumferential spacing 118B. For the embodiment depicted, the first circumferential spacing 118A is at least about twenty percent greater than the second circumferential spacing 118B, such as at least about twenty-five percent greater such as at least about thirty percent greater, such as up to about two hundred percent greater. Notably, as will be described in greater detail below, the circumferential spacing 118 refers to a mean circumferential spacing between adjacent part span inlet guide vanes 100. The non-uniform circumferential spacing may, e.g., offset structure upstream of the part span inlet guide vanes 100.

Referring back to FIGS. 1 and 2, as discussed above, the outer nacelle 50 includes an inlet 60 at a leading edge 61 of the outer nacelle 50. The inlet 60 defines an interior inlet surface 63 that is non-annular. In this manner, the non-annular circumference of the inlet 60 guides the volume of air 58 that enters the turbofan engine 10 through the inlet 60 of the outer nacelle 50. Furthermore, the non-annular circumference of the inlet 60 also begins the pre-swirling flow forward of the fan blades 40.

Referring to FIG. 2, the non-annular circumference of the inlet 60 and each of the plurality of part span inlet guide vanes 100 are configured to pre-swirl an airflow 58 provided through the inlet 60 of the nacelle 50, upstream of the plurality of fan blades 40 of the fan 38. As briefly discussed above, pre-swirling the airflow 58 provided through the inlet 60 of the nacelle 50 prior to such airflow 58 reaching the plurality of fan blades 40 of the fan 38 may reduce separation losses and/or shock losses, allowing the fan 38 to operate with the relatively high fan tip speeds described above with less losses in efficiency.

Referring back to FIG. 4, an exemplary embodiment of the inlet 60 defining an interior inlet surface 63 that is non-annular will now be discussed. For example, the interior inlet surface 63 includes a plurality of rounded portions 200 that are located circumferentially around the outer nacelle 50. In an exemplary embodiment, the plurality of rounded portions 200 include a scallop shape. In other exemplary embodiments, the plurality of rounded portions 200 include curved, arcuate, or other rounded shapes. In exemplary embodiments, the plurality of rounded portions 200 are aligned in the axial direction A (FIG. 2). In exemplary embodiments, the plurality of rounded portions 200 extend approximately 0.0001 inch to approximately 0.010 inch into the interior inlet surface 63 of the outer nacelle 50. In other exemplary embodiments, the plurality of rounded portions 200 extend approximately 0.0001 inch to approximately 0.250 inch into the interior inlet surface 63 of the outer nacelle 50.

Referring to FIG. 4, in an exemplary embodiment, the plurality of rounded portions 200 and the plurality of part span inlet guide vanes 100 are disposed circumferentially in an alternating arrangement. For example, in such a configuration, one rounded portion 200 is located between each pair of part span inlet guide vanes 100 as shown in FIG. 4.

Figure 5:
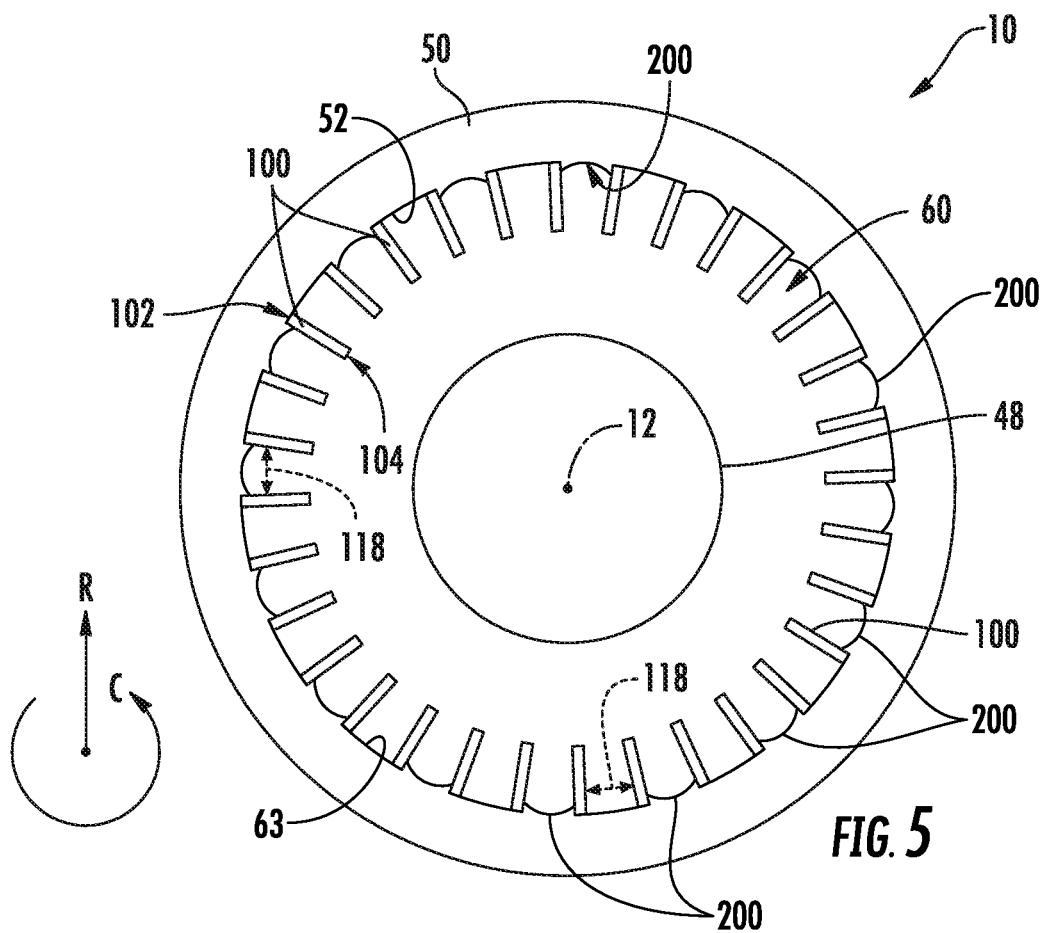
FIG. 5 is a schematic view of an inlet to the exemplary gas turbine engine of FIG. 1, along an axial direction of the gas turbine engine of FIG. 1 according to another exemplary embodiment of the present subject matter.

Referring now to FIG. 5, an axial view of the inlet 60 to the turbofan engine 10 of FIGS. 1 and 2, according to another exemplary embodiment, is provided. Referring to FIG. 5, in another exemplary embodiment, one of the plurality of rounded portions 200 is sequentially disposed circumferentially between every other of the plurality of part span inlet guide vanes 100.

Figure 6:
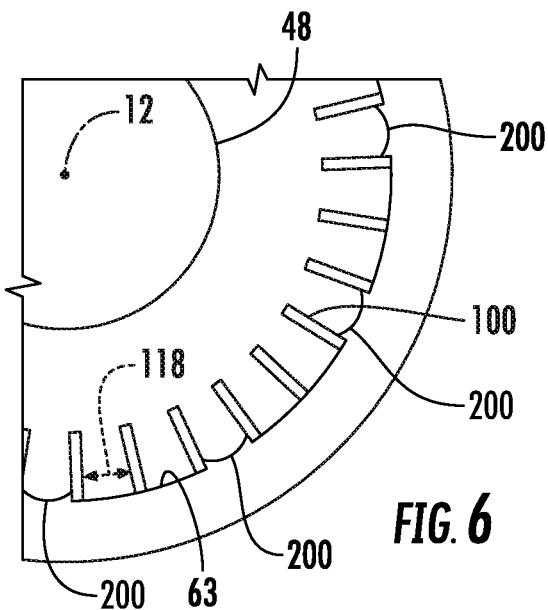
FIG. 6 is a partial schematic view of an inlet to the exemplary gas turbine engine of FIG. 1, along an axial direction of the gas turbine engine of FIG. 1 according to another exemplary embodiment of the present subject matter.

Referring now to FIG. 6, a partial axial view of the inlet 60 to the turbofan engine 10 of FIGS. 1 and 2, according to another exemplary embodiment, is provided. Referring to FIG. 6, in another exemplary embodiment, one of the plurality of rounded portions 200 is sequentially disposed circumferentially between every third of the plurality of part span inlet guide vanes 100.

Figure 7:
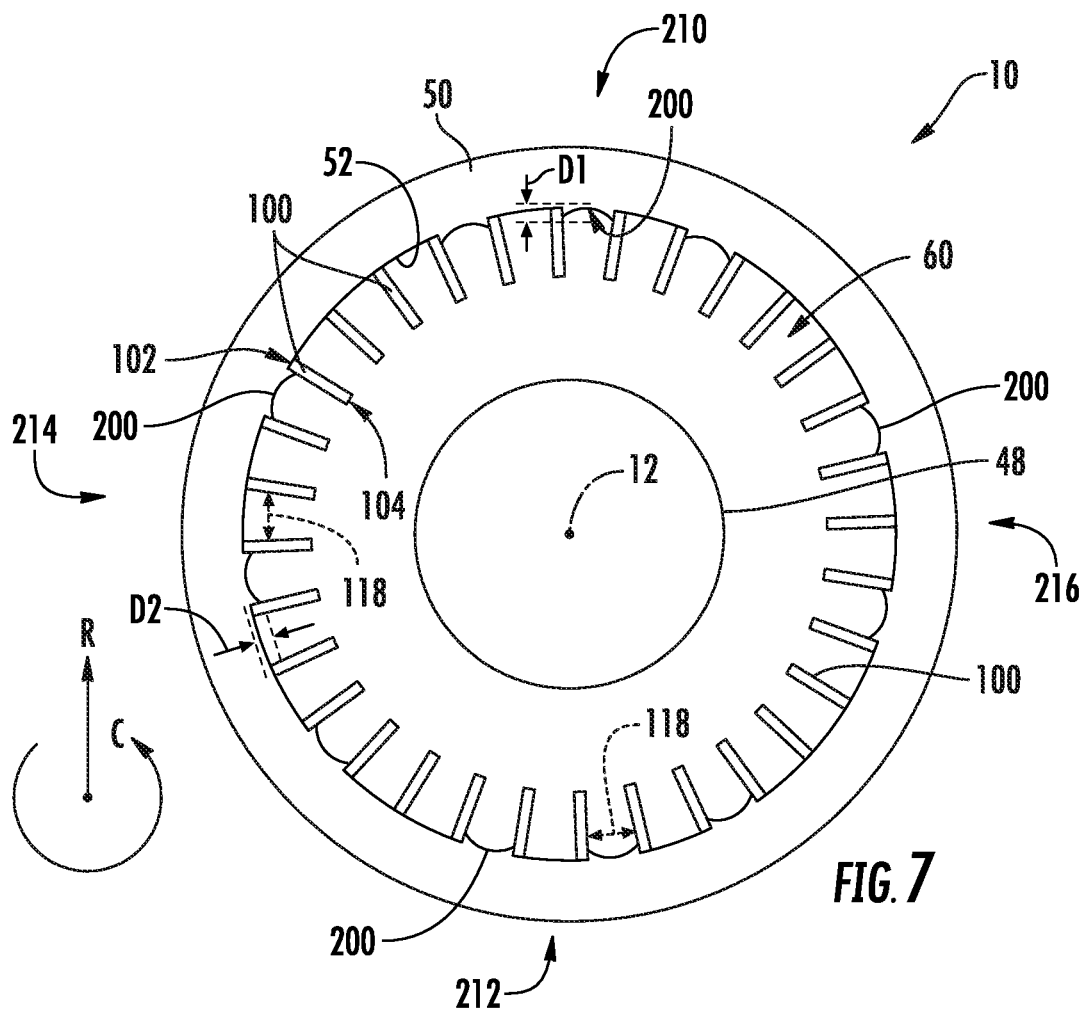
FIG. 7 is a schematic view of an inlet to the exemplary gas turbine engine of FIG. 1, along an axial direction of the gas turbine engine of FIG. 1 according to another exemplary embodiment of the present subject matter.

Referring now to FIG. 7, an axial view of the inlet 60 to the turbofan engine 10 of FIGS. 1 and 2, according to another exemplary embodiment, is provided. Referring to FIG. 7, in another exemplary embodiment, the configurations of the plurality of rounded portions 200 and the plurality of part span inlet guide vanes 100 are different at various positions of the outer nacelle 50.

Referring to FIG. 7, the outer nacelle 50 includes a top portion 210, a bottom portion 212, a first side portion 214, and a second side portion 216. In such an exemplary embodiment, the plurality of rounded portions 200 are sequentially disposed circumferentially relative to the plurality of part span inlet guide vanes 100 in a first configuration at the top portion 210 and the bottom portion 212 of the outer nacelle 50. For example, in the first configuration, one of the plurality of rounded portions 200 is sequentially disposed circumferentially between every other of the plurality of part span inlet guide vanes 100. It is contemplated that any other configuration of the plurality of rounded portions 200 and the plurality of part span inlet guide vanes 100 can be used in the first configuration.

Furthermore, in such an exemplary embodiment, the plurality of rounded portions 200 are sequentially disposed circumferentially relative to the plurality of part span inlet guide vanes 100 in a second configuration at the first side portion 214 and the second side portion 216 of the outer nacelle 50, wherein the first configuration and the second configuration are different. For example, in the second configuration, one of the plurality of rounded portions 200 is sequentially disposed circumferentially between every third of the plurality of part span inlet guide vanes 100. It is contemplated that any other configuration of the plurality of rounded portions 200 and the plurality of part span inlet guide vanes 100 can be used in the second configuration.

It is also contemplated that a different configuration of the plurality of rounded portions 200 and the plurality of part span inlet guide vanes 100 can be used at each of the top portion 210, the bottom portion 212, the first side portion 214, and the second side portion 216 of the outer nacelle 50.

Furthermore, it is contemplated that in an exemplary embodiment, the plurality of rounded portions 200 extend a first depth D1 into the interior inlet surface 63 of the outer nacelle 50 at the top portion 210 and the bottom portion 212 of the outer nacelle 50. In such an exemplary embodiment, the plurality of rounded portions 200 extend a second depth D2 into the interior inlet surface 63 of the outer nacelle 50 at the first side portion 214 and the second side portion 216 of the outer nacelle 50, wherein the first depth D1 and the second depth D2 are different.

It is also contemplated that a depth that the plurality of rounded portions 200 extend into the interior inlet surface 63 of the outer nacelle 50 can be different at each of the top portion 210, the bottom portion 212, the first side portion 214, and the second side portion 216 of the outer nacelle 50.

Referring back to FIG. 2, in an exemplary embodiment, the plurality of rounded portions 200 extend from the leading edge 61 of the outer nacelle 50 to a location upstream of the inlet pre-swirl feature, e.g., the part span inlet guide vanes 100.

Figure 3:
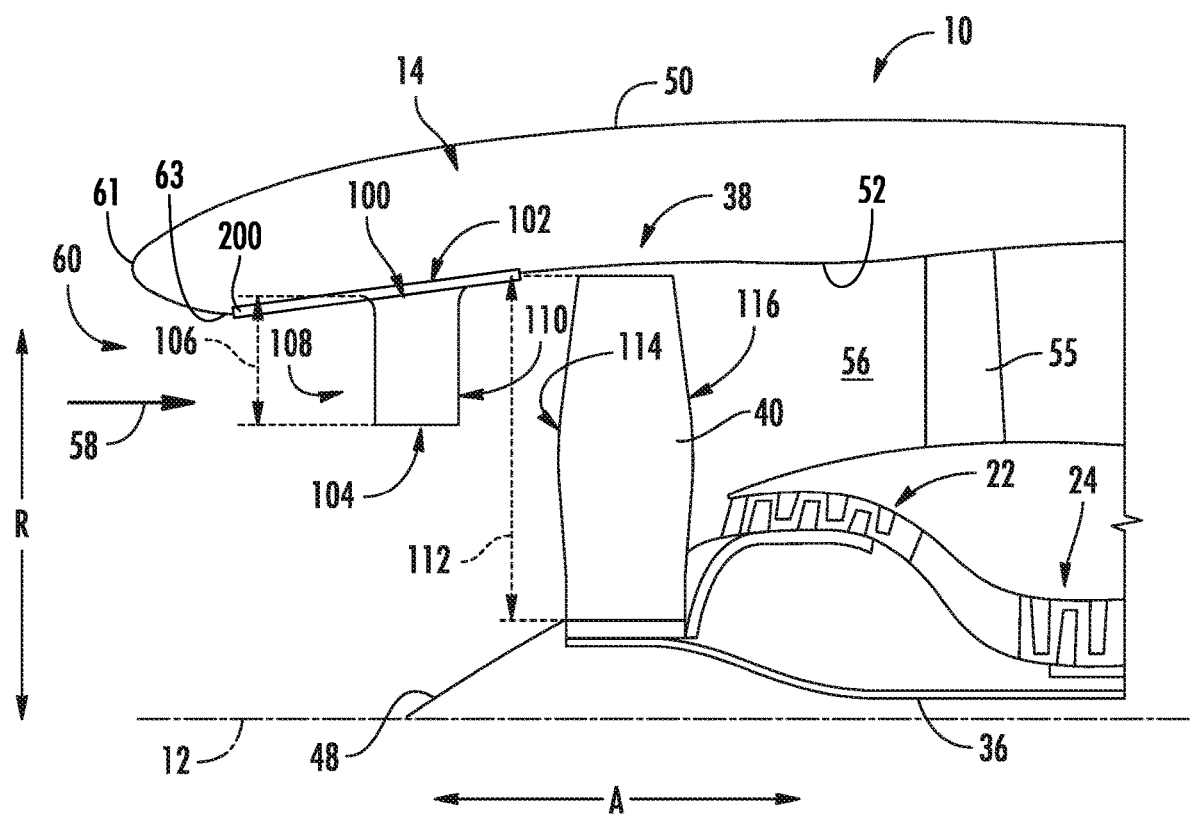
FIG. 3 is a close-up, schematic view of a forward end of the exemplary gas turbine engine of FIG. 1 according to another exemplary embodiment of the present subject matter.

It is contemplated that other configurations of the plurality of rounded portions 200 may be utilized. For example, referring back to FIG. 3, in an exemplary embodiment, the plurality of rounded portions 200 extend from the leading edge 61 of the outer nacelle 50 to a location aft or downstream of the inlet pre-swirl feature, e.g., the part span inlet guide vanes 100.

In other exemplary embodiments, it is contemplated that a first group of the plurality of rounded portions 200 extend from the leading edge 61 of the outer nacelle 50 to a location upstream of the inlet pre-swirl feature, e.g., the part span inlet guide vanes 100, and a second group of the plurality of rounded portions 200 extend from the leading edge 61 of the outer nacelle 50 to a location aft or downstream of the inlet pre-swirl feature, e.g., the part span inlet guide vanes 100.

Referring back to FIG. 8, in an exemplary embodiment including eight part span inlet guide vanes 100, it is contemplated that any configuration of the plurality of rounded portions 200 and the plurality of part span inlet guide vanes 100 may be utilized. For example, in one exemplary embodiment, one of the plurality of rounded portions 200 is sequentially disposed circumferentially between every other of the plurality of part span inlet guide vanes 100.

Figure 9:
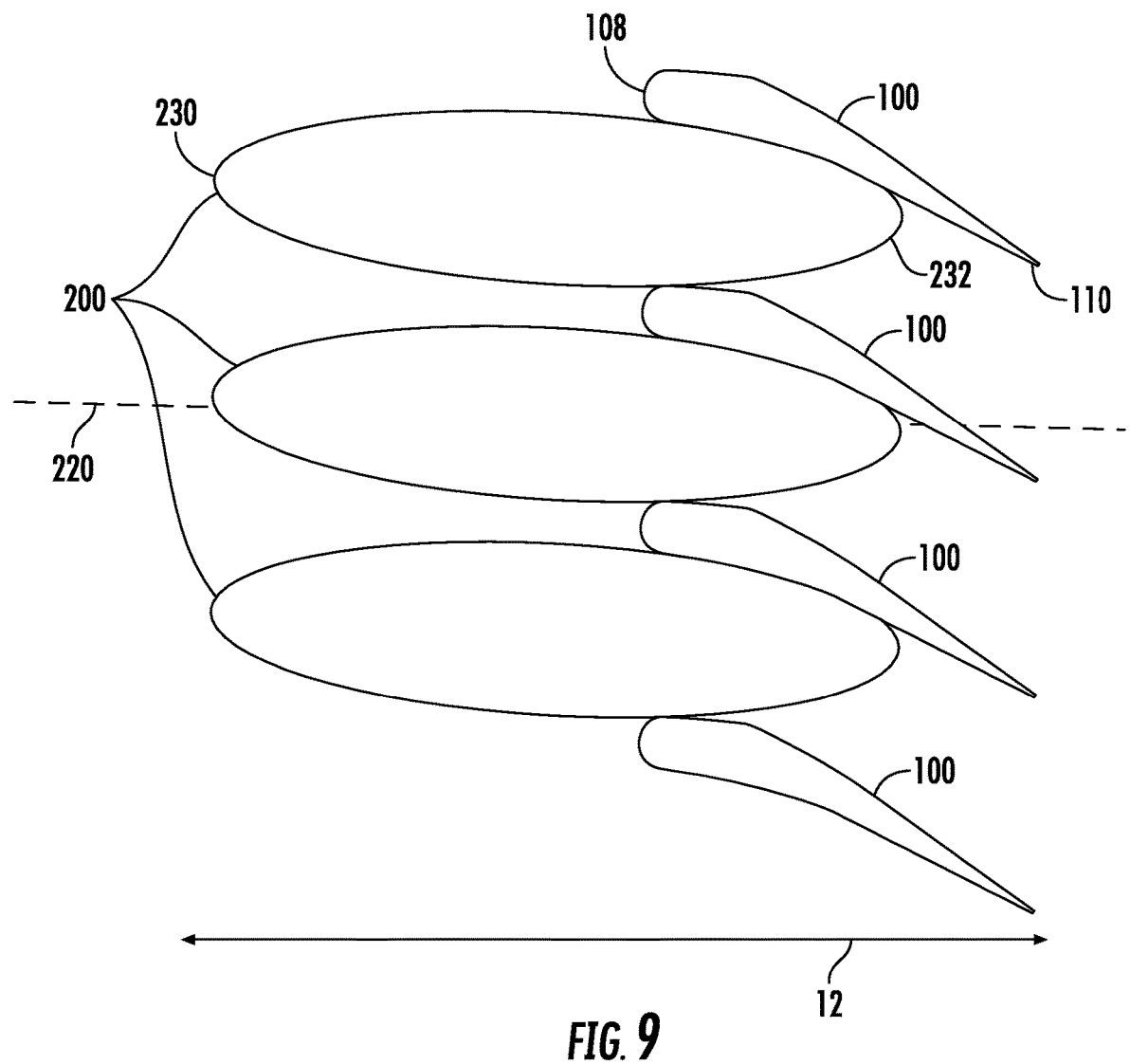
FIG. 9 is a schematic view of a portion of a part span inlet guide vane and a rounded portion in accordance with another exemplary embodiment of the present disclosure.

Referring now to FIG. 9, a schematic view of a portion of the part span inlet guide vanes 100 and the plurality of rounded portions 200 is provided. As is depicted, in an exemplary embodiment, the plurality of rounded portions 200 define a rounded portion longitudinal axis 220 and the rounded portion longitudinal axis 220 is aligned with the longitudinal axis 12 of the turbofan engine 10 (FIG. 1).

Furthermore, in an exemplary embodiment, the plurality of rounded portions 200 include a first end 230 and a second end 232 and the plurality of part span inlet guide vanes 100 include a leading edge 108 and a trailing edge 110. In the embodiment depicted, the first end 230 of the plurality of rounded portions 200 is forward of the leading edge 108 of the plurality of part span inlet guide vanes 100 and the second end 232 of the plurality of rounded portions 200 is forward of the trailing edge 110 of the plurality of part span inlet guide vanes 100.

Figure 10:
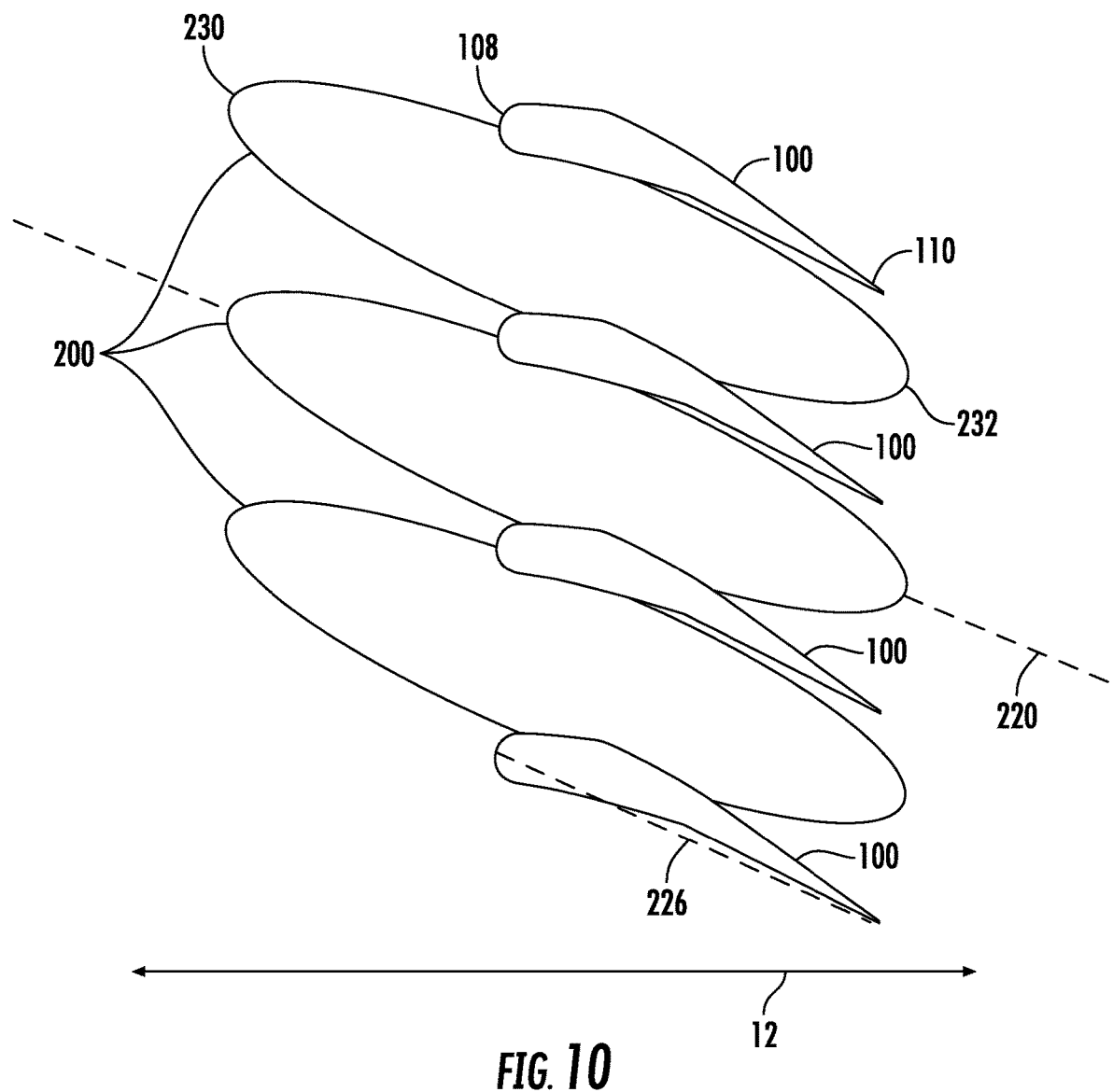
FIG. 10 is a schematic view of a portion of a part span inlet guide vane and a rounded portion in accordance with another exemplary embodiment of the present disclosure.

Referring now to FIG. 10, a schematic view of a portion of the part span inlet guide vanes 100 and the plurality of rounded portions 200 is provided. As is depicted, in another exemplary embodiment, the plurality of rounded portions 200 define a rounded portion longitudinal axis 220 and the rounded portion longitudinal axis 220 is oblique to the longitudinal axis 12 of the turbofan engine 10 (FIG. 1). For example, it is contemplated that the rounded portion longitudinal axis 220 is aligned with a chord line 226 of the part span inlet guide vanes 100.

Furthermore, in an exemplary embodiment, the plurality of rounded portions 200 include a first end 230 and a second end 232 and the plurality of part span inlet guide vanes 100 include a leading edge 108 and a trailing edge 110. In the embodiment depicted, the first end 230 of the plurality of rounded portions 200 is forward of the leading edge 108 of the plurality of part span inlet guide vanes 100 and the second end 232 of the plurality of rounded portions 200 is aft of the trailing edge 110 of the plurality of part span inlet guide vanes 100. In such an embodiment, it is also contemplated that the second end 232 of the plurality of rounded portions 200 may be aligned with or even with the trailing edge 110 of the plurality of part span inlet guide vanes 100.

Figure 11:
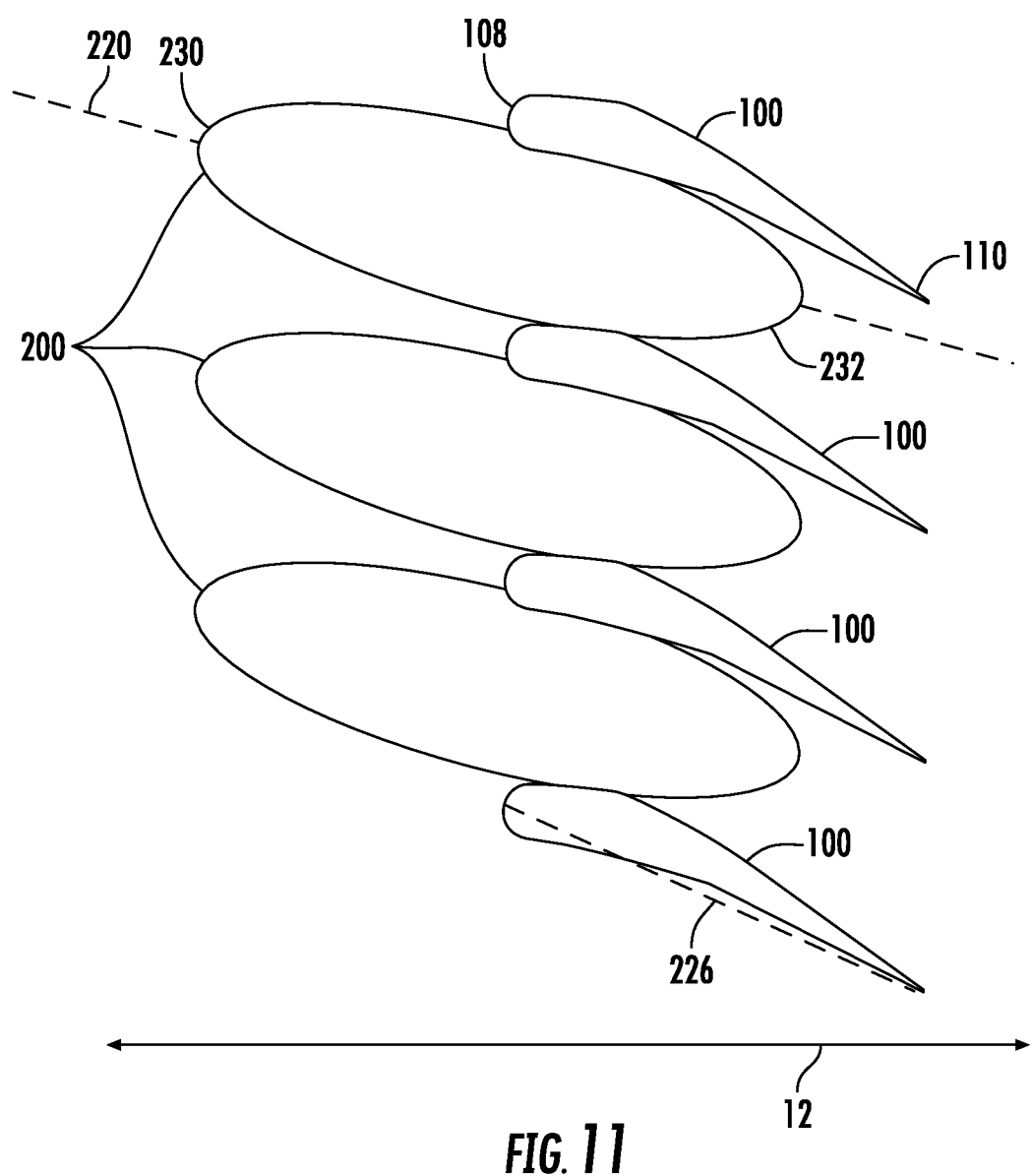
FIG. 11 is a schematic view of a portion of a part span inlet guide vane and a rounded portion in accordance with another exemplary embodiment of the present disclosure.

Referring now to FIG. 11, a schematic view of a portion of the part span inlet guide vanes 100 and the plurality of rounded portions 200 is provided. As is depicted, in another exemplary embodiment, the plurality of rounded portions 200 define a rounded portion longitudinal axis 220 and the rounded portion longitudinal axis 220 is oblique to the longitudinal axis 12 of the turbofan engine 10 (FIG. 1). For example, it is contemplated that the rounded portion longitudinal axis 220 is aligned with a chord line 226 of the part span inlet guide vanes 100. It is also contemplated that the rounded portion longitudinal axis 220 is aligned with a chord angle at a leading edge 108 of the part span inlet guide vanes 100.

Furthermore, in an exemplary embodiment, the plurality of rounded portions 200 include a first end 230 and a second end 232 and the plurality of part span inlet guide vanes 100 include a leading edge 108 and a trailing edge 110. In the embodiment depicted, the first end 230 of the plurality of rounded portions 200 is forward of the leading edge 108 of the plurality of part span inlet guide vanes 100 and the second end 232 of the plurality of rounded portions 200 is forward of the trailing edge 110 of the plurality of part span inlet guide vanes 100. In such an embodiment, it is also contemplated that the second end 232 of the plurality of rounded portions 200 is aft of the leading edge 108 of the plurality of part span inlet guide vanes 100.

Figure 12:
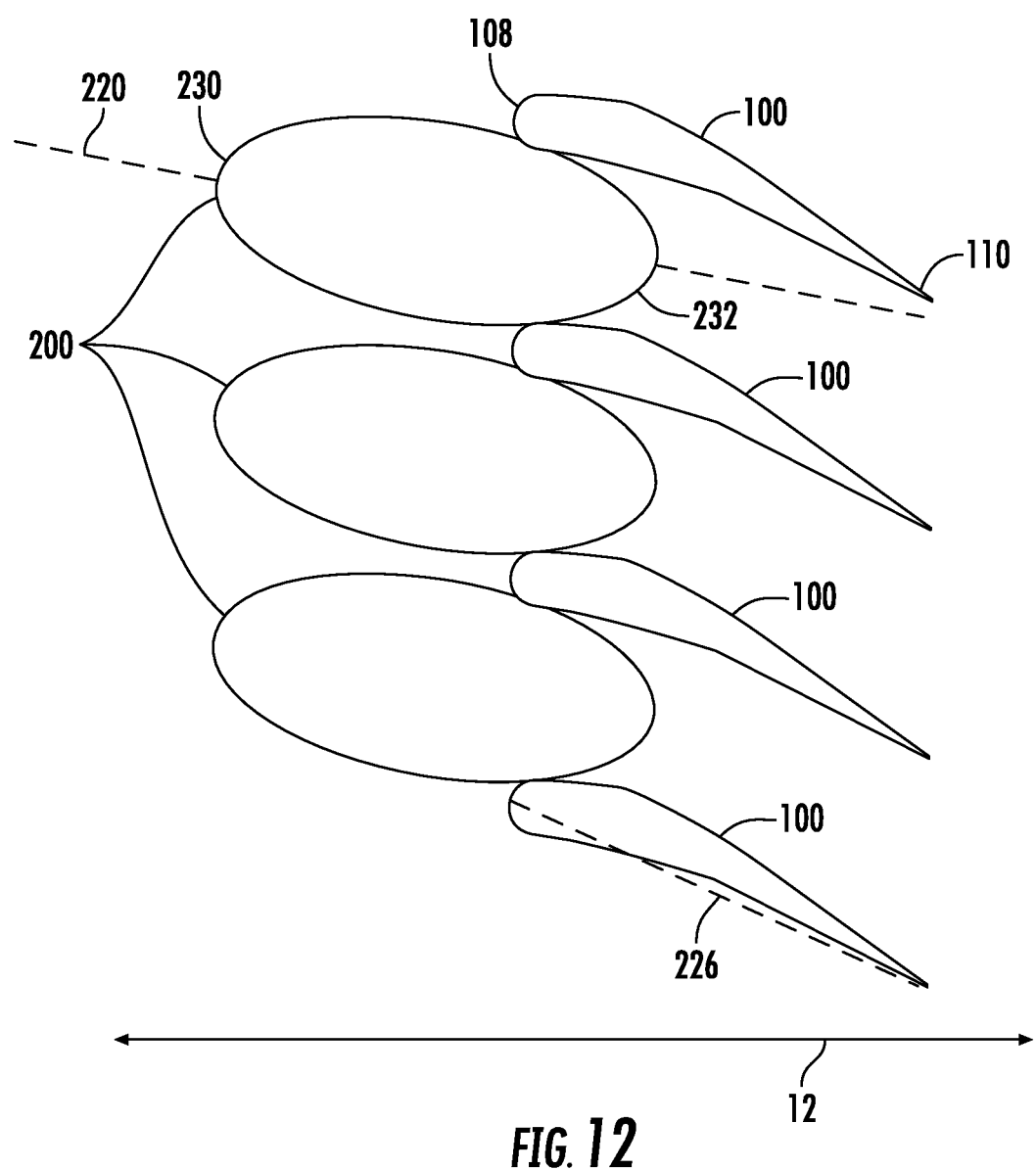
FIG. 12 is a schematic view of a portion of a part span inlet guide vane and a rounded portion in accordance with another exemplary embodiment of the present disclosure.

Referring now to FIG. 12, a schematic view of a portion of the part span inlet guide vanes 100 and the plurality of rounded portions 200 is provided. As is depicted, in another exemplary embodiment, the plurality of rounded portions 200 define a rounded portion longitudinal axis 220 and the rounded portion longitudinal axis 220 is oblique to the longitudinal axis 12 of the turbofan engine 10 (FIG. 1). For example, it is contemplated that the rounded portion longitudinal axis 220 is aligned with a chord line 226 of the part span inlet guide vanes 100. It is also contemplated that the rounded portion longitudinal axis 220 is aligned with an incident angle at a leading edge 108 of the part span inlet guide vanes 100.

Furthermore, in an exemplary embodiment, the plurality of rounded portions 200 include a first end 230 and a second end 232 and the plurality of part span inlet guide vanes 100 include a leading edge 108 and a trailing edge 110. In the embodiment depicted, the first end 230 of the plurality of rounded portions 200 is forward of the leading edge 108 of the plurality of part span inlet guide vanes 100 and the second end 232 of the plurality of rounded portions 200 is forward of the trailing edge 110 of the plurality of part span inlet guide vanes 100. In such an embodiment, it is also contemplated that the second end 232 of the plurality of rounded portions 200 is aft of the leading edge 108 of the plurality of part span inlet guide vanes 100.

Figure 13:
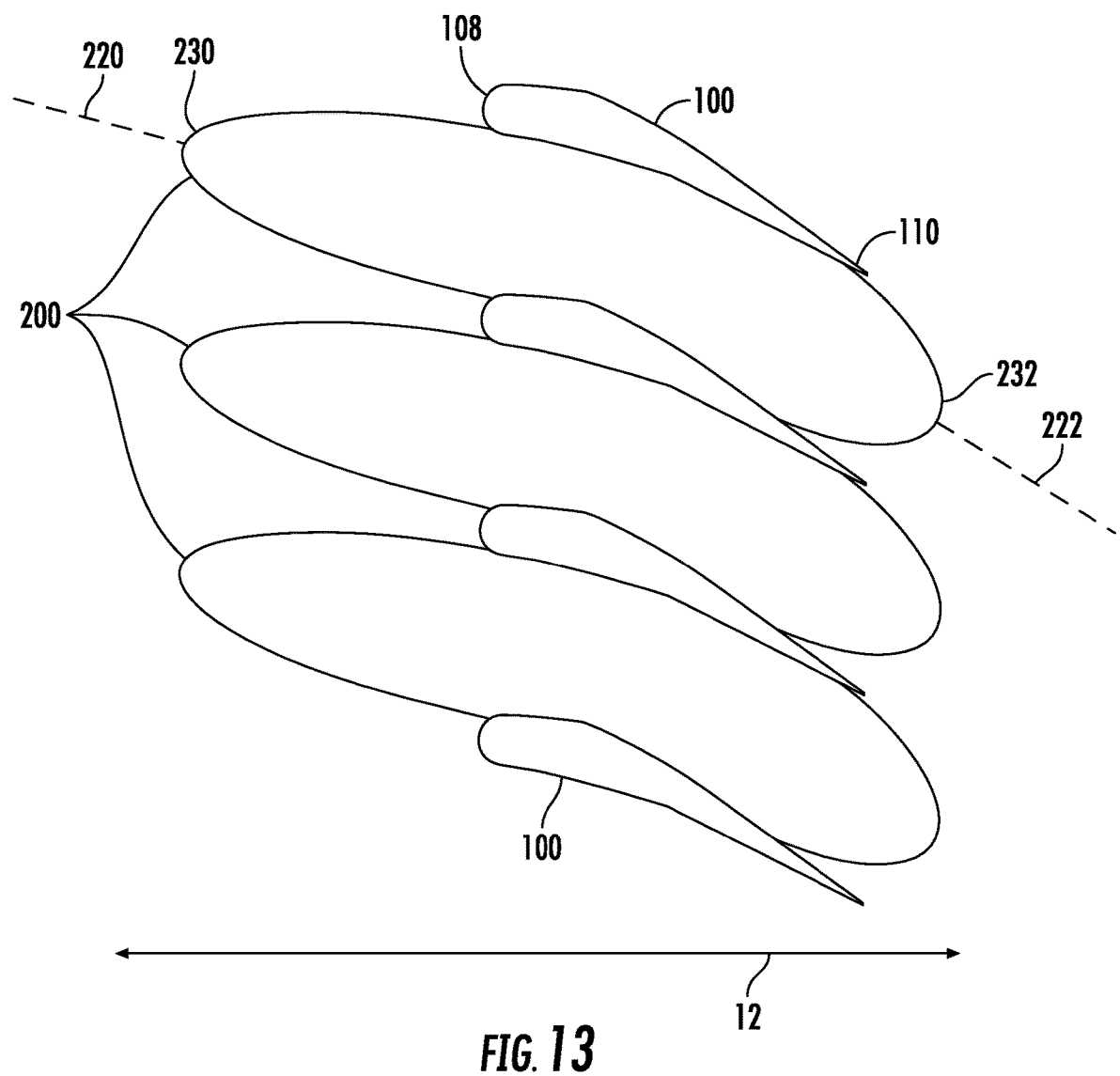
FIG. 13 is a schematic view of a portion of a part span inlet guide vane and a rounded portion in accordance with another exemplary embodiment of the present disclosure.

Referring now to FIG. 13, a schematic view of a portion of the part span inlet guide vanes 100 and the plurality of rounded portions 200 is provided. As is depicted, in another exemplary embodiment, the plurality of rounded portions 200 define a first rounded portion longitudinal axis 220 and a second rounded portion longitudinal axis 222. The first rounded portion longitudinal axis 220 and the second rounded portion longitudinal axis 222 are oblique to the longitudinal axis 12 of the turbofan engine 10 (FIG. 1). For example, it is contemplated that an angle of the second rounded portion longitudinal axis 222 with respect to the longitudinal axis 12 of the turbofan engine 10 (FIG. 1) is greater than an angle of the first rounded portion longitudinal axis 220 with respect to the longitudinal axis 12 of the turbofan engine 10 (FIG. 1).

Furthermore, in an exemplary embodiment, the plurality of rounded portions 200 include a first end 230 and a second end 232 and the plurality of part span inlet guide vanes 100 include a leading edge 108 and a trailing edge 110. In the embodiment depicted, the first end 230 of the plurality of rounded portions 200 is forward of the leading edge 108 of the plurality of part span inlet guide vanes 100 and the second end 232 of the plurality of rounded portions 200 is aft of the trailing edge 110 of the plurality of part span inlet guide vanes 100. In such an embodiment, it is also contemplated that the second end 232 of the plurality of rounded portions 200 may be aligned with or even with the trailing edge 110 of the plurality of part span inlet guide vanes 100.

Further aspects of the disclosure are provided by the subject matter of the following clauses:

A turbofan engine defining a longitudinal axis and comprising: a fan comprising a plurality of fan blades; a turbomachine operably coupled to the fan for driving the fan, the turbomachine comprising a compressor section, a combustion section, and a turbine section in serial flow order and together defining a core air flowpath; a nacelle surrounding and at least partially enclosing the fan, the nacelle including an inlet at a leading edge of the nacelle, the inlet defining an interior inlet surface that is non-annular; and an inlet pre-swirl feature located upstream of the plurality of fan blades, the inlet pre-swirl feature attached to or integrated into the nacelle.

The turbofan engine of any preceding clause, wherein the interior inlet surface includes a plurality of rounded portions located circumferentially around the nacelle.

The turbofan engine of any preceding clause, wherein the inlet pre-swirl feature comprises a plurality of part span inlet guide vanes extending from the nacelle upstream of the plurality of fan blades and aft of the inlet of the nacelle.

The turbofan engine of any preceding clause, wherein the plurality of rounded portions and the plurality of part span inlet guide vanes are disposed circumferentially in an alternating arrangement.

The turbofan engine of any preceding clause, wherein one of the plurality of rounded portions is sequentially disposed circumferentially between every other of the plurality of part span inlet guide vanes.

The turbofan engine of any preceding clause, wherein the plurality of rounded portions define a rounded portion longitudinal axis, and wherein the rounded portion longitudinal axis is aligned with the longitudinal axis of the turbofan engine.

The turbofan engine of any preceding clause, wherein the plurality of rounded portions define a rounded portion longitudinal axis, and wherein the rounded portion longitudinal axis is oblique to the longitudinal axis of the turbofan engine.

The turbofan engine of any preceding clause, wherein the plurality of rounded portions include a first end and a second end, wherein the plurality of part span inlet guide vanes include a leading edge and a trailing edge, and wherein the first end of the plurality of rounded portions is forward of the leading edge of the plurality of part span inlet guide vanes and the second end of the plurality of rounded portions is aft of the trailing edge of the plurality of part span inlet guide vanes.

The turbofan engine of any preceding clause, wherein the plurality of rounded portions include a first end and a second end, wherein the plurality of part span inlet guide vanes include a leading edge and a trailing edge, and wherein the first end of the plurality of rounded portions is forward of the leading edge of the plurality of part span inlet guide vanes and the second end of the plurality of rounded portions is forward of the trailing edge of the plurality of part span inlet guide vanes.

The turbofan engine of any preceding clause, wherein the nacelle includes a top portion, a bottom portion, a first side portion, and a second side portion, wherein the plurality of rounded portions are sequentially disposed circumferentially relative to the plurality of part span inlet guide vanes in a first configuration at the top portion and the bottom portion of the nacelle, wherein the plurality of rounded portions are sequentially disposed circumferentially relative to the plurality of part span inlet guide vanes in a second configuration at the first side portion and the second side portion of the nacelle, and wherein the first configuration and the second configuration are different.

The turbofan engine of any preceding clause, wherein the plurality of rounded portions extend approximately 0.0001 inch to approximately 0.250 inch into the interior inlet surface of the nacelle.

The turbofan engine of any preceding clause, wherein the nacelle includes a top portion, a bottom portion, a first side portion, and a second side portion, wherein the plurality of rounded portions extend a first depth into the interior inlet surface of the nacelle at the top portion and the bottom portion, wherein the plurality of rounded portions extend a second depth into the interior inlet surface of the nacelle at the first side portion and the second side portion, and wherein the first depth and the second depth are different.

The turbofan engine of any preceding clause, wherein the plurality of rounded portions comprise a scallop shape.

A nacelle assembly for a turbofan engine, the turbofan engine comprising a fan including a plurality of fan blades, the nacelle assembly configured to circumferentially surround the fan, the nacelle assembly comprising: an inlet at a leading edge of the nacelle assembly, the inlet defining an interior inlet surface that is non-annular; and an inlet pre-swirl feature located upstream of the plurality of fan blades, the inlet pre-swirl feature attached to or integrated into the nacelle assembly.

The nacelle assembly of any preceding clause, wherein the interior inlet surface includes a plurality of rounded portions located circumferentially around the nacelle assembly.

The nacelle assembly of any preceding clause, wherein the inlet pre-swirl feature comprises a plurality of part span inlet guide vanes extending from the nacelle assembly upstream of the plurality of fan blades and aft of the inlet of the nacelle assembly.

The nacelle assembly of any preceding clause, wherein the plurality of rounded portions and the plurality of part span inlet guide vanes are disposed circumferentially in an alternating arrangement.

The nacelle assembly of any preceding clause, wherein one of the plurality of rounded portions is sequentially disposed circumferentially between every other of the plurality of part span inlet guide vanes.

The nacelle assembly of any preceding clause, wherein one of the plurality of rounded portions is sequentially disposed circumferentially between every third of the plurality of part span inlet guide vanes.

The nacelle assembly of any preceding clause, wherein the nacelle assembly includes a top portion, a bottom portion, a first side portion, and a second side portion, wherein the plurality of rounded portions are sequentially disposed circumferentially relative to the plurality of part span inlet guide vanes in a first configuration at the top portion and the bottom portion of the nacelle assembly, wherein the plurality of rounded portions are sequentially disposed circumferentially relative to the plurality of part span inlet guide vanes in a second configuration at the first side portion and the second side portion of the nacelle assembly, and wherein the first configuration and the second configuration are different.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A turbofan engine defining a longitudinal axis, the turbofan engine comprising:
   a fan comprising a plurality of fan blades;
   a turbomachine operably coupled to the fan for driving the fan, the turbomachine comprising a compressor section, a combustion section, and a turbine section in serial flow order and together defining a core air flowpath;
   a nacelle surrounding and at least partially enclosing the fan, the nacelle including an inlet at a leading edge of the nacelle, the inlet defining an interior inlet surface that is non-annular; and
   an inlet pre-swirl feature located upstream of the plurality of fan blades, the inlet pre-swirl feature attached to or integrated into the nacelle.

2. The turbofan engine of claim 1, wherein the interior inlet surface includes a plurality of rounded portions located circumferentially around the nacelle.

3. The turbofan engine of claim 2, wherein the inlet pre-swirl feature comprises a plurality of part span inlet guide vanes extending from the nacelle upstream of the plurality of fan blades and aft of the inlet of the nacelle.

4. The turbofan engine of claim 3, wherein the plurality of rounded portions and the plurality of part span inlet guide vanes are disposed circumferentially in an alternating arrangement.

5. The turbofan engine of claim 3, wherein one of the plurality of rounded portions is sequentially disposed circumferentially between every other of the plurality of part span inlet guide vanes.

6. The turbofan engine of claim 3, wherein the plurality of rounded portions define a rounded portion longitudinal axis, and wherein the rounded portion longitudinal axis is aligned with the longitudinal axis of the turbofan engine.

7. The turbofan engine of claim 3, wherein the plurality of rounded portions define a rounded portion longitudinal axis, and wherein the rounded portion longitudinal axis is oblique to the longitudinal axis of the turbofan engine.

8. The turbofan engine of claim 3, wherein the plurality of rounded portions include a first end and a second end, wherein the plurality of part span inlet guide vanes include a leading edge and a trailing edge, and wherein the first end of the plurality of rounded portions is forward of the leading edge of the plurality of part span inlet guide vanes and the second end of the plurality of rounded portions is aft of the trailing edge of the plurality of part span inlet guide vanes.

9. The turbofan engine of claim 3, wherein the plurality of rounded portions include a first end and a second end, wherein the plurality of part span inlet guide vanes include a leading edge and a trailing edge, and wherein the first end of the plurality of rounded portions is forward of the leading edge of the plurality of part span inlet guide vanes and the second end of the plurality of rounded portions is forward of the trailing edge of the plurality of part span inlet guide vanes.

10. The turbofan engine of claim 3, wherein the nacelle includes a top portion, a bottom portion, a first side portion, and a second side portion,
    wherein the plurality of rounded portions are sequentially disposed circumferentially relative to the plurality of part span inlet guide vanes in a first configuration at the top portion and the bottom portion of the nacelle, wherein the plurality of rounded portions are sequentially disposed circumferentially relative to the plurality of part span inlet guide vanes in a second configuration at the first side portion and the second side portion of the nacelle, and wherein the first configuration and the second configuration are different.

11. The turbofan engine of claim 3, wherein the plurality of rounded portions extend approximately 0.0001 inch to approximately 0.250 inch into the interior inlet surface of the nacelle.

12. The turbofan engine of claim 11, wherein the nacelle includes a top portion, a bottom portion, a first side portion, and a second side portion, wherein the plurality of rounded portions extend a first depth into the interior inlet surface of the nacelle at the top portion and the bottom portion, wherein the plurality of rounded portions extend a second depth into the interior inlet surface of the nacelle at the first side portion and the second side portion, and wherein the first depth and the second depth are different.

13. The turbofan engine of claim 2, wherein the plurality of rounded portions comprise a scallop shape.

14. A nacelle assembly for a turbofan engine, the turbofan engine comprising a fan including a plurality of fan blades, the nacelle assembly configured to circumferentially surround the fan, the nacelle assembly comprising:

an inlet at a leading edge of the nacelle assembly, the inlet defining an interior inlet surface that is non-annular; and an inlet pre-swirl feature located upstream of the plurality of fan blades, the inlet pre-swirl feature attached to or integrated into the nacelle assembly.

15. The nacelle assembly of claim 14, wherein the interior inlet surface includes a plurality of rounded portions located circumferentially around the nacelle assembly.

16. The nacelle assembly of claim 15, wherein the inlet pre-swirl feature comprises a plurality of part span inlet guide vanes extending from the nacelle assembly upstream of the plurality of fan blades and aft of the inlet of the nacelle assembly.

17. The nacelle assembly of claim 16, wherein the plurality of rounded portions and the plurality of part span inlet guide vanes are disposed circumferentially in an alternating arrangement.

18. The nacelle assembly of claim 16, wherein one of the plurality of rounded portions is sequentially disposed circumferentially between every other of the plurality of part span inlet guide vanes.

19. The nacelle assembly of claim 16, wherein one of the plurality of rounded portions is sequentially disposed circumferentially between every third of the plurality of part span inlet guide vanes.

20. The nacelle assembly of claim 16, wherein the nacelle assembly includes a top portion, a bottom portion, a first side portion, and a second side portion, wherein the plurality of rounded portions are sequentially disposed circumferentially relative to the plurality of part span inlet guide vanes in a first configuration at the top portion and the bottom portion of the nacelle assembly, wherein the plurality of rounded portions are sequentially disposed circumferentially relative to the plurality of part span inlet guide vanes in a second configuration at the first side portion and the second side portion of the nacelle assembly, and wherein the first configuration and the second configuration are different.

* * * * *